Patented Aug. 14, 1945

2,381,984

UNITED STATES PATENT OFFICE 2,381,984

INTENSIFICATION OF THE IMAGE OF DIAZO-TYPE LIGHT SENSITIVE LAYERS ON A TRANSPARENT BASE

Maximilian K. Reichel, Easton, Pa., assignor to General Aniline & Film Corporation, New York, N. Y., a corporation of Delaware No Drawing. Application July 24, 1943, Serial No. 496,084

6 Claims. (Cl. 95—7)

This invention relates to the production of diazotype light sensitive layers and particularly to the improvement of the image obtained by using such light sensitive layers.

In the duplication of originals which are transparent or semi-transparent such as tracings or engineering drawings and typewritten documents by the diazotype positive reproduction method, it is highly desirable that the image reproduced on the diazotype be one of high contrast. Accordingly, the selection of dye components for the production of the light sensitive layer is limited to those components which will produce deep shades upon development of the image. Many other dye components which upon development produce light shades will reproduce the image of the original. Due to the low contrast of such image the prints are not suitable and usable reproductions. Accordingly, it is an object of this invention to improve the contrast of the image produced by the dyes of light shade the components of which are otherwise suitable for light sensitive diazo reproduction media.

In the duplication of originals which are opaque to light or which transmit insufficient light to energize the light sensitive surface of diazotype reproduction media originals which may be printed on both sides of the page, the so-called reflex diazotype copying process is employed. In this process it is desirable to employ a transparent light sensitive diazotype medium as an intermediate wherein the light sensitive layer contains a dye component or dye components which, upon development, will produce dyes highly absorptive of actinic light. Such a reflex copying process is described in U. S. Patent No. 2,245,-628 issued June 17, 1941. The process described in said patent involves the coating of a suitable transparent base such as regenerated cellulose with a solution containing a diazo compound and an azo coupling component which, upon development, will yield a yellow to greenish-yellow dye. Such a transparent base containing the diazo light sensitive layer is then used to make an intermediate positive mirror copy of the opaque original by placing the sensitive transparent reproduction medium on the original and causing light to fall upon the transparent reproduction medium. Wherever there is a white or faintly colored area of the original, both transmitted and reflected light will be incident upon the light sensitive surface of the transparent reproduction medium. Transmitted light only will be incident upon the light sensitive layer wherever black or deep colors appear on the original. Consequently, in copying an ordinary printed page or a drawing on an opaque surface by this method, a lesser amount of light will be available to destroy the diazo compound in the light sensitive layer wherever there are dark colored lines, print or the like on the original. The diazo compound contained in the light sensitive layer of the transparent reproduction medium, therefore, becomes completely destroyed where it is exposed to both transmitted and reflected light and becomes destroyed to a lesser degree when exposed to only transmitted light. Upon development of the image on the exposed transparent reproduction medium, the design of the original becomes reproduced in a faint yellow to greenish-yellow shade. The relative depth of color of this low contrast reproduction depends upon the degree of contrast between the design and the background of the original and, due to the fact that the difference between the illumination from the transmitted light and the illumination from the reflected light is small, it is difficult in any event to produce a high contrast print on the transparent reproduction medium. Owing to the low contrast of the intermediate prints obtainable by this method, it is difficult to check the intermediate print for flaws in reproduction and for exposure characteristics before using the intermediate for the production of final diazotype prints on opaque diazotype paper.

Diazo compounds and azo components could be used in the light sensitive layer of the transparent intermediate reproduction medium to produce colors of higher contrast, such as dark blue, maroon or black, and such a method has been tried as indicated in the above-mentioned Patent No. 2,245,628. However, it has been found that even though good images of high contrast are obtained on the intermediate transparent diazo print, such high contrast intermediates cannot be employed successfully to make final diazotype prints on opaque diazotype paper since the colors themselves are not sufficiently opaque to actinic light. Accordingly, it is a further object of this invention to produce an intermediate diazo print on a transparent base of high contrast while preserving the good copying qualities of those colors which are highly absorptive of actinic light.

It has been found that the addition of inorganic or organic iodine or bromine compounds to the light sensitive layers containing the diazo compound having the specifically required photochemical characteristic necessary for the production of intermediate diazotype prints, greatly improves the contrast of the reproduction. The desired photochemical property of the azo dye obtained from the diazo compound employed in the light sensitive layer is represented by a broad absorption band covering the greenblue-violet range. This property is not affected by the addition of the iodine or bromine compound nor is the ability of the developed image to absorb actinic light impaired. Surprisingly, however, the tints of the intermediate diazotypes obtainable can be varied to a considerable extent depending on the concentration of the iodine or bromine compounds used in the coating solution.

Any salt of iodine or bromine or of hydrogen iodide and hydrogen bromide may be added to the coating solution to produce this enrichment or intensification of the color shades obtainable on a transparent intermediate diazotype print. Inorganic salts, such as alkali metal and alkaline earth metal salts of iodine and bromine and salts of iodine and bromine, the metal component of which is selected from group 2 of the periodic system, for instance, Mg, Ca, Zn, Sr, and Ba, have been found particularly suitable. Organic iodides and bromides are also useful and those which have been found particularly suitable include organic compounds of metalloids of the fifth and sixth groups of the periodic table, which metalloids are at least tetravalent and are combined with at least 3 mols of a member of the group consisting of saturated and unsaturated alkyl radicals and aryl radicals.

This method of intensifying the color is applicable to any diazotype reproduction medium carrying a diazo compound as the light sensitive element on any suitable base. When the azo component is also carried in the light sensitive layer as in the so-called two component dry development diazotypes, it is desirable that the diazo compound be one to which can be assigned the quinonoid structure such as diazos of p-diamines, particularly mono-nuclear p-diamines o- and p-amino phenols and naphthols, and o-diamines wherein the undiazotized amino group is at least mono substituted. Where a transparent base is used and particularly where reflex copying is desired, as indicated above, the selection of the diazo compound and azo component should be such that the resulting dye will absorb light chiefly in the region between 3300 Å to 4400 Å, such dyes being yellow to greenish-yellow. Suitable diazo compounds and azo components for this purpose are described in U. S. Patents 2,245,628 and 2,246,425.

The following examples are illustrative of the invention, but are not intended to in any way limit the scope thereof. The parts are by weight unless otherwise stated.

*Examples*

I. A coating solution was prepared in an aqueous solution, 1000 ccs. of which contained:

| | Parts |
|---|---|
| Zinc chloride double salt of the diazo-compound of 1 - monoethyl-amino - 2 - methyl-4-aminobenzene | 70 |
| Resorcinol | 143 |
| Phloroglucinol | 3.9 |
| Tartaric Acid | 30 |
| Potassium iodide | 30 |
| Phosphoric acid | 24 |
| Isopropyl alcohol | 210 |
| Thiourea | 40 |
| Sodium salt of the naphthalene-1·3·6-trisulfonic acid | 23 |

A regenerated cellulose foil was impregnated with this coating solution and the foil dried in the usual manner. Upon placing the so sensitized foil over an opaque original, which it was desired to copy, and exposing it to light, followed by a subsequent development with gaseous ammonia, a dark olive-brown intense shade was obtained, reproducing the original image. Excellent reproductions of this dark olive-brown image on the regenerated cellulose foil were obtained when using the said regenerated cellulose foil bearing the image, in the usual way, as a transparent original with diazotype opaque reproduction paper.

If the regenerated cellulose foil is impregnated with the same coating solution, omitting the potassium iodide, only a light yellow tint is obtained after exposure and development, which, due to its weakness and poor contrast, is of far less practical value in the production of subsequent copies than the print containing the image in the olive-brown shade obtainable from this example.

II. Using the same coating solution as employed in Example I, but containing 30 gms. of sodium bromide in place of the 30 gms. of potassium iodide and treating a regenerated cellulose foil in the same manner as outlined in Example I, a slightly lighter olive-brown image is obtained than in the case of Example I.

Omission of the sodium bromide from this coating solution results in the same light yellow tint after exposure and development obtained as mentioned in Example I.

III. A coating solution was prepared by making up an aqueous solution, 1000 ccs. of which contained:

| | Parts |
|---|---|
| Zinc chloride double salt of the diazo-compound of 1 - monoethyl-amino - 2 - methyl-4-aminobenzene | 70 |
| Resorcinol | 143 |
| Phloroglucinol | 3.9 |
| Tartaric acid | 30 |
| Barium iodide | 20 |
| Formic acid | 24 |
| Isopropyl alcohol | 210 |
| Thiourea | 40 |
| The sodium salt of the naphthalene-1·3·6-trisulfonic acid | 23 |

A regenerated cellulose foil was impregnated with this coating solution and the foil dried the usual way. Upon exposing the so sensitized foil over an opaque original and subsequently developing the exposed foil with gaseous ammonia, an olive-brown image was obtained. Upon subsequently using this foil containing the reproduced image as a transparent original, copies of excellent contrast were obtained on diazotype opaque reproduction paper.

In this example, calcium iodide or zinc iodide may be substituted for the barium iodide in the same quantitative proportion and with the same results.

IV. An aqueous coating solution was prepared, 1000 ccs. of which contained:

| | Parts |
|---|---|
| Zinc chloride double salt of the diazo-compound of 1-monoethyl-amino-2-methyl-4-aminobenzene | 70 |
| Resorcinol | 143 |
| Tartaric acid | 30 |
| Thiourea | 40 |
| Sodium salt of the naphthalene-1·3·6-trisulfonic acid | 23 |
| Formic acid | 50 |
| Isopropyl alcohol | 210 |
| Trimethyl sulfonium iodide (prepared according to the prescription given in Beilstein, vol. I, p. 290) | 10 |

A regenerated cellulose foil was impregnated with this coating solution and the foil dried in the usual manner. The foil sensitized by this coating was then exposed to light over an original design on an opaque background. After exposure the image was developed on the sensitized foil with gaseous ammonia. The design of the original was obtained in an intense dark red-orange shade on the transparent background of the regenerated cellulose foil. This transparent print was then used as a positive original to produce a positive duplicate on diazotype opaque reproduction paper by exposing the latter to light through the transparent original in the usual manner. An excellent reproduction of the opaque original from which the regenerated cellulose transparent copy was taken was thus obtained.

The same coating solution, prepared as above but omitting the 10 parts of trimethyl sulfonium iodide, was used to coat the regenerated cellulose foil for comparison with the foil coated as above. This foil was exposed to light over the original design on an opaque background in the same manner as above and the exposed foil was then developed with ammonia. In this case, the original design was reproduced in a very light yellow color of such poor contrast that the design was barely discernible.

In this example the following organic iodides and bromides may be substituted for the trimethyl sulfonium iodide in the proportions indicated:

Grams

Methyl-triphenyl arsonium iodide per liter (prepared in accordance with the prescription of Beilstein vol. XVI, p. 829)_____ 22.4
Allyl-triphenyl arsonium iodide per liter (prepared in accordance with the prescription of Beilstein vol. XVI, p. 829)_____ 23.6
Allyl-triphenyl-arsonium bromide per liter (prepared in accordance with the prescription of Beilstein, vol. XVI, p. 829)_____ 20
Iodomethyl-triphenyl arsonium iodide per liter (prepared in accordance with the prescription of Beilstein vol. XVI, p. 829)___ 28.6
Ethyl-triphenyl phosphonium iodide per liter (prepared in accordance with the prescription of Beilstein vol. XVI, p. 760)___ 20.8
Allyl-triphenyl phosphonium iodide per liter (prepared in accordance with the prescription of Beilstein vol. XVI, p. 760)_____ 20
Allyl-triphenyl phosphonium bromide per liter (prepared in accordance with the prescription of Beilstein vol. XVI, p. 760)___ 20
Methylene - bis - triphenyl - phosphonium iodide per liter (prepared in accordance with the prescription of Beilstein vol. XVI, p. 761)_____ 26.9

All of these organic iodides and bromides, when substituted for the trimethyl sulfonium iodide in the above coating solution, will, upon exposure, reproduce the design of the original in intense red-orange colors having the same good contrast characteristic against the transparent background of the regenerated cellulose foil as is produced in the case of the trimethyl sulfonium iodide. Also the same good results are obtained as in the case of the trimethyl sulfonium iodide when using the intermediate regenerated cellulose transparent print as a positive for the production of the final image of the opaque original on diazotype opaque reproduction paper.

V. A coating solution was prepared in an aqueous solution, 1000 ccs. of which contained:

Parts

Zinc chloride double salt of the diazo compound obtained from 1-N-ethanol-ethyl-4-aminobenzene _____ 52.5
Citric acid_____ 50
Thiourea _____ 40
Sodium salt of the 1·3·6-naphthalene-trisulfonic acid_____ 23
2·3-dioxynaphthalene _____ 35
Formic acid_____ 50
Isopropyl alcohol_____ 210
Zinc iodide_____ 20

A regenerated cellulose foil was impregnated with this coating solution and the foil then dried in the usual manner. The thus sensitized foil was then placed under a transparent original bearing a dark design on a light background and exposed to light. After exposure, the image of the original was developed on the foil by exposing the foil to gaseous ammonia. The design of the original was reproduced in a deep blue shade of excellent contrast.

The same coating solution as employed in this example, omitting the zinc iodide, gives only a very light violet tint on the transparent foil after the foil has been exposed and developed as above.

Barium iodide and calcium iodide may be substituted for the zinc iodide of this example in the same proportion and with substantially the same results.

VI. An aqueous coating solution was prepared, 1000 ccs. of which contained:

Parts

Anhydride of 2·1-diazo-hydroxy-naphthalene-4-sulfonic acid_____ 37.5
Formic acid_____ 30
Citric acid_____ 30
Phloroglucinol _____ 33
Nickelsulfate _____ 200
Isopropyl alcohol_____ 210
Thiourea _____ 20
Zinc iodide_____ 20

A regenerated cellulose foil was impregnated with this coating solution and the foil dried in the usual manner. The sensitized foil was then exposed to light over an opaque original bearing a dark design on a light background. The exposed light sensitive foils was then developed in the usual manner with gaseous ammonia. The image of the original was obtained in a deep violet shade of good contrast. This transparent foil bearing the image of the original was then used as a positive original to reproduce the image on opaque light sensitive diazotype reproduction paper by exposing the latter to light through the transparent foil. An excellent reproduction of the original on a light opaque background was thus obtained.

The same coating solution as used in this example, omitting the zinc iodide, reproduces the image of the original in a light yellowish-brown tint of low contrast on the regenerated cellulose foil after coating, exposure and development in the same manner as above.

If 10 parts of trimethyl sulfonium iodide per liter (prepared according to Beilstein vol. 1, p. 290) is substituted for the 20 parts of zinc iodide in this example, substantially the same results are obtained as in the case of the zinc iodide.

Although I have particularly described my invention for the intensification of the color produced by a diazotype layer on a transparent base in connection with the reflex copying process wherein the transparent copy of the original is used as an intermediate for the production of a final copy, which final copy is a reproduction of an opaque original, nevertheless, it is understood that this process can as well be used for the intensification of any color obtained by the diazotype method on a suitable base whether the image produced is used in the reflex copying process for the reproduction of opaque originals or whether it is used in the ordinary copying process for the reproduction of transparent or semitransparent originals on transparent or opaque base copies. As has been indicated above, it has been found that the best results are obtained in the reflex copying process when diazo compounds and azo coupling components are employed which will yield a yellow to greenish-yellow dye. In view of the low contrast of the image produced by these dye components which have proved most favorable for the reflex copying process, my intensification method is especially suitable for such reflex copies, since it permits the reproduction of the original on the transparent intermediate with good contrast while at the same time preserving the optimum copying characteristics of the low contrast dye obtainable without the application of my color intensification method.

Having now particularly set forth and described my invention and having illustrated the best method of performing it, what I now claim as new is:

1. A light sensitive layer on a suitable base comprising a diazo compound and a member of the group consisting of iodine and bromine salts of alkali and alkaline earth metals, zinc and metalloids of the fifth and sixth groups of the periodic table which metalloids are at least tetravalent and are combined with at least three mols of a member of the group consisting of saturated and unsaturated alkyl and aryl radicals.

2. A light sensitive layer on a suitable base comprising a diazo compound derived from an amino compound of the group consisting of o-aminonaphthols and p-diamines of the benzene series, an azo component and a member of the group consisting of iodine and bromine salts of alkali and alkaline earth metals, zinc and metalloids of the fifth and sixth groups of the periodic table which metalloids are at least tetravalent and are combined with at least three mols of a member of the group consisting of saturated and unsaturated alkyl and aryl radicals.

3. A light sensitive layer on a transparent base comprising a diazo compound derived from an amino compound of the group consisting of o-amino-naphthols and p-diamines of the benzene series and an azo component which, upon development, yield a yellow to greenish-yellow dye and a member of the group consisting of iodine and bromine salts of alkali metals, alkaline earth metals, zinc and metalloids of the fifth and sixth groups of the periodic table which metalloids are at least tetravalent and are combined with at least three mols of a member of the group consisting of saturated and unsaturated alkyl and aryl radicals.

4. A light sensitive layer on a transparent base comprising a diazo compound derived from an amino compound of the group consisting of o-amino-naphthols and p-diamines of the benzene series and an azo component which, upon development, yield a yellow to greenish-yellow dye and potassium iodide.

5. A light sensitive layer on a transparent base comprising a diazo compound derived from an amino compound of the group consisting of o-amino-naphthols and p-diamines of the benzene series and an azo component which, upon development, yield a yellow to greenish-yellow dye and barium iodide.

6. A light sensitive layer on a transparent base comprising a diazo compound derived from an amino compound of the group consisting of o-amino-naphthols and p-diamines of the benzene series, and an azo component which, upon development, yield a yellow to greenish-yellow dye and zinc iodide.

MAXIMILIAN K. REICHEL.